United States Patent
McCoy et al.

(10) Patent No.: US 9,596,508 B2
(45) Date of Patent: Mar. 14, 2017

(54) DEVICE FOR ACQUISITION OF VIEWER INTEREST WHEN VIEWING CONTENT

(71) Applicants: Sony Corporation, Tokyo (JP); Sony Network Entertainment International LLC, Los Angeles, CA (US)

(72) Inventors: Charles McCoy, Coronado, CA (US); Leo Pedlow, Ramona, CA (US); True Xiong, San Diego, CA (US)

(73) Assignees: SONY CORPORATION, Tokyo (JP); SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 13/832,510

(22) Filed: Mar. 15, 2013

(65) Prior Publication Data

US 2014/0282646 A1    Sep. 18, 2014

(51) Int. Cl.
| | |
|---|---|
| *H04N 21/422* | (2011.01) |
| *H04N 21/442* | (2011.01) |
| *H04N 13/04* | (2006.01) |
| *H04N 21/4223* | (2011.01) |
| *G06K 9/00* | (2006.01) |

(52) U.S. Cl.
CPC ... *H04N 21/44218* (2013.01); *G06K 9/00597* (2013.01); *H04N 13/0429* (2013.01); *H04N 21/4223* (2013.01); *H04N 21/42201* (2013.01); *H04N 21/44213* (2013.01)

(58) Field of Classification Search
CPC ....... H04N 21/42201; H04N 21/44213; H04N 21/44218; H04N 13/0429
See application file for complete search history.

(56) References Cited

U.S. PATENT DOCUMENTS

| | | | |
|---|---|---|---|
| 7,006,881 B1* | 2/2006 | Hoffberg et al. | 700/83 |
| 2003/0093784 A1* | 5/2003 | Dimitrova et al. | 725/10 |
| 2006/0093998 A1* | 5/2006 | Vertegaal | 434/236 |
| 2006/0106646 A1* | 5/2006 | Squilla et al. | 705/3 |
| 2010/0010370 A1 | 1/2010 | De Lemos et al. | |
| 2010/0211439 A1* | 8/2010 | Marci et al. | 705/10 |
| 2011/0182472 A1 | 7/2011 | Hansen | |
| 2011/0271312 A1* | 11/2011 | Arnouse | 725/106 |
| 2011/0279666 A1 | 11/2011 | Strombom et al. | |

(Continued)

FOREIGN PATENT DOCUMENTS

| | | |
|---|---|---|
| RU | 68719 U1 | 11/2007 |
| WO | WO 2009/046224 | 4/2009 |

(Continued)

OTHER PUBLICATIONS

International Search Report and Written Opinion issued in corresponding International Application No. PCT/US14/27241 dated Jun. 2, 2014.

(Continued)

*Primary Examiner* — Ricky Chin
(74) *Attorney, Agent, or Firm* — Frommer Lawrence & Haug LLP; William S. Frommer

(57) ABSTRACT

In order to acquire a viewer's enjoyment and interest when viewing three-dimensional contents on a consumer electronic device, a viewer's eyes are monitored in real-time. Biometric data from the monitoring can be used for delivery of highly accurate and personalized viewing experiences for the viewer.

33 Claims, 3 Drawing Sheets

(56) References Cited

U.S. PATENT DOCUMENTS

| | | |
|---|---|---|
| 2012/0290401 A1 | 11/2012 | Neven |
| 2013/0012829 A1* | 1/2013 | Jo .................................. 600/544 |
| 2013/0117771 A1* | 5/2013 | Lee et al. ......................... 725/10 |
| 2013/0219417 A1* | 8/2013 | Gilson et al. .................... 725/12 |
| 2013/0232523 A1* | 9/2013 | Daniel ............................. 725/25 |
| 2013/0331729 A1* | 12/2013 | de Lemos et al. ............. 600/558 |
| 2013/0340006 A1* | 12/2013 | Kwan .............................. 725/39 |
| 2014/0096152 A1* | 4/2014 | Ferens et al. .................... 725/12 |

FOREIGN PATENT DOCUMENTS

| | | |
|---|---|---|
| WO | WO 2012/083415 | 6/2012 |
| WO | WO 2013/033842 | 3/2013 |

OTHER PUBLICATIONS

Russian Office Action dated Mar. 24, 2014.

\* cited by examiner

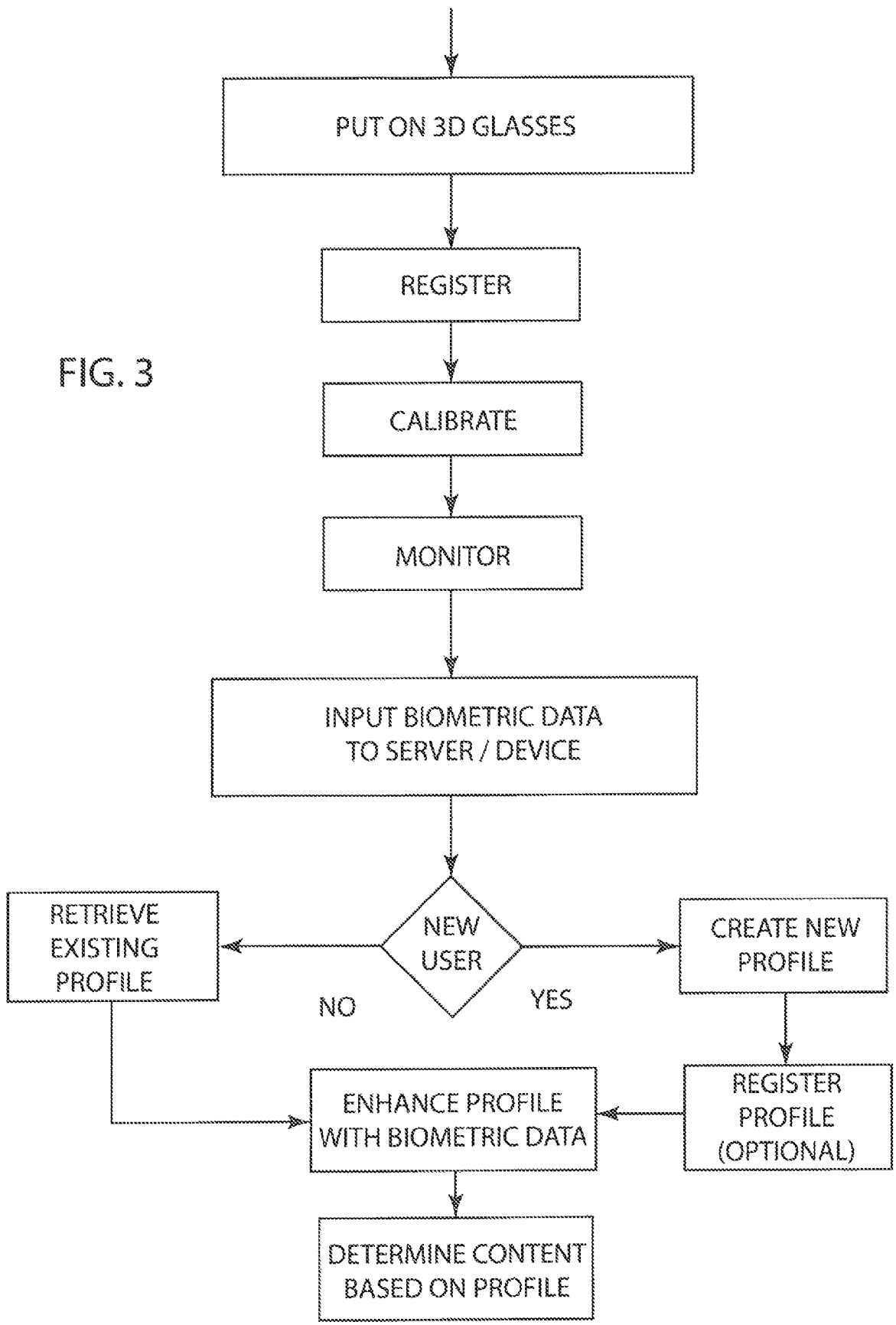

DEVICE FOR ACQUISITION OF VIEWER INTEREST WHEN VIEWING CONTENT

FIELD OF THE INVENTION

Disclosed is a device for acquiring a degree of real-time viewer interest when viewing content on a consumer electronic device via human biometrics. The invention involves being able to track and monitor a viewer's sight biometrics in real-time, specifically the viewer's eyes when viewing content, on a consumer electronic device.

BACKGROUND OF THE INVENTION

Producers and distributors of media content currently obtain business information about the types, amount, genres, etc. of content that consumer electronic devices consume. However, what is not known is the percent of consumed content by consumer electronic devices that are owned by the manufacturer of the electronic device. Furthermore, the manufacturers of the electronic devices have not been able to determine what percent of the types, genres, etc. are enjoyed by the electronic device manufacturer's customers. Additionally, until now, there has been no way to acquire biometric information in an unobtrusive manner.

SUMMARY OF THE INVENTION

The present invention is directed to mounting a plurality of sensors on three dimensional (3D) glasses which a user wears while watching 3D content, in order to unobtrusively obtain biometric information about the user, so that highly accurate personalized content can be delivered at any location to the user.

BRIEF DESCRIPTION OF THE DRAWINGS

FIG. 3 shows a method of using the invention.

DETAILED DESCRIPTION

The present invention is directed to a device for acquisition of real-time viewer interest when viewing content, including internet-protocol (IP) content, on a consumer electronic device via human biometrics. The consumer electronic device may be an internet-enabled consumer electronic device. Real-time tracking and monitoring of viewer's sight biometrics is used. Specifically, the user's eyes, when viewing content on the consumer electronic device, are monitored. The biometric data obtained are eye gazing, fixation, movements and pupil dilation as well as other biometric data to be discussed below. The obtained biometric data is used to determine a degree of interest and infer a viewer's satisfaction about the viewer's content viewing experience.

Figure 1:
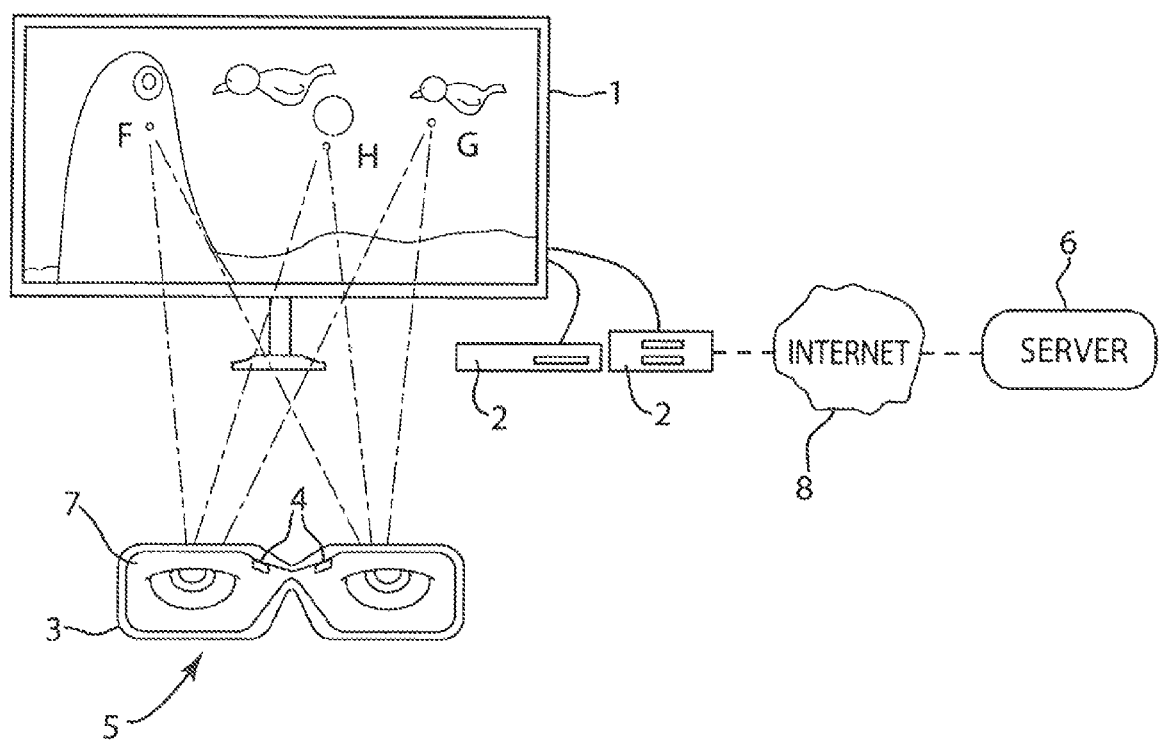
FIG. 1 shows the 3D display device and how a user wearing 3D glasses with trackers watches the 3D display.

FIG. 1 shows eye trackers 4 attached to 3D glasses 5 either by being embedded or being plug-able modules. The trackers 4 are for tracking the user's eyes. An eye or set of eyes are tied to a user profile. Data of sight biometrics is maintained over the span of a user's viewing history. Over time, biometric data showing a user's degree of interest is known. Alternatively, in real-time, biometric data can also be displayed showing the correlation of biometric data points to a particular object in a scene.

The result of this invention is that at any place or location and at any time, an entry point by the viewer to access highly accurate personalized content is provided based on eye recognition.

As shown in FIG. 1, a display device 1 for displaying images as well as 3D images is used in conjunction with 3D glasses 5. The 3D glasses 5 include a frame 3, 3D lenses 7 and cameras/eye trackers 4 (sensors). The display device 1 is attached to consumer electronics devices 2, which may be internet-enabled and include such devices as a set top box, game station, VCR, VTR, DVD, etc. In order to view a three-dimensional image on the display 1, a user should wear the 3D glasses 5. The consumer electronic devices 2 are wirelessly enabled such as by Wi-Fi, infrared, Bluetooth, etc. In addition, the consumer electronic devices 2 may communicate over the internet 8 with a server 6 or the consumer electronic device may use the biometric data itself.

Figure 4:
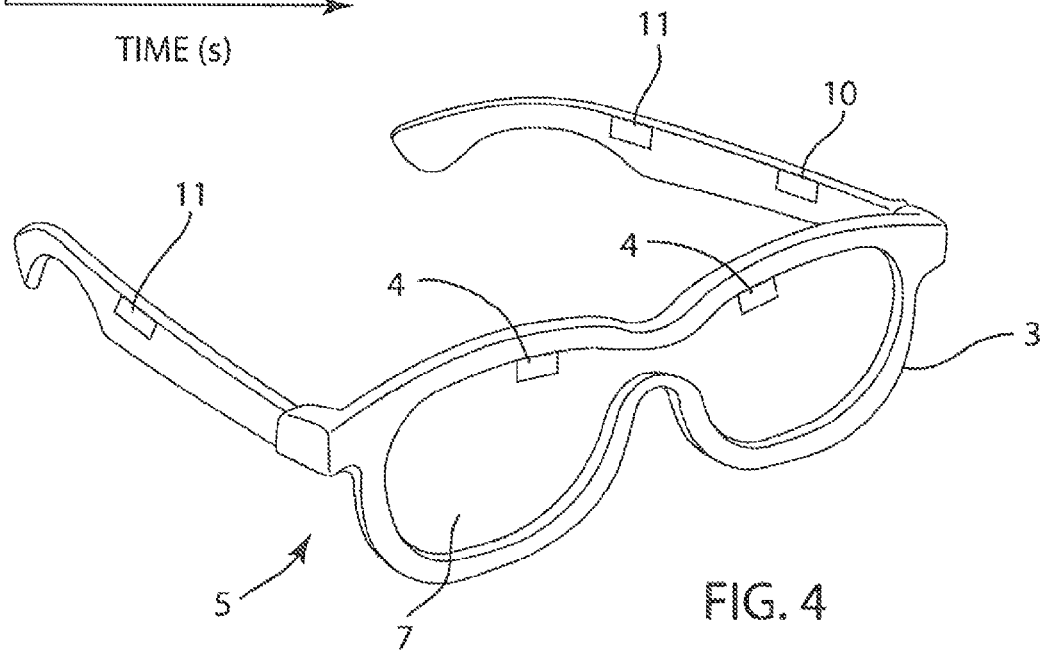
FIG. 4 shows additional sensors for the 3D glasses.

The 3D glasses 5 have a wireless transmitter 10 (see FIG. 4) in order to transmit the obtained biometric data to the consumer electronic device(s) 2. Placement of the transmitter 10 in FIG. 4 is only illustrative and can be placed anywhere on the 3D glasses 5. The consumer electronic device(s) 2, after receiving the biometric data, may transmit the biometric data over the internet 8 to the server 6 for analysis and storage or the consumer electronic device may use the information itself. For example, the biometric data can be used by either the server or consumer electronic device to select which content to play next based on which portions of the content the user is paying attention to. Alternatively, the consumer electronic device can analyze the biometric data and then send summary information, such as the user's interest level (or point of gaze) at each point during play of the content, to the server.

As shown in FIG. 1, the trackers 4 are mounted onto the 3D glasses 5. While FIG. 1 shows the trackers 4 mounted near the center portion of the 3D glasses 5, the exact location is variable as long as the trackers 4 are able to track the viewer's eye movement unobtrusively. By using the trackers 4, a viewer's eye gaze, fixation, movements and pupil dilations can be tracked and monitored in real-time. The trackers 4 can detect blinking, squinting, and when the user closes his/her eyes. This can be used to tell when the user, at least partially, closes his/her eyes in situations where the user can't or doesn't want to look at the content. The trackers 4 can also detect points where the user falls asleep.

By using the trackers 4, the user can register his/her eyes on the server 6 or consumer electronic device in order to build a profile of content interest or satisfaction. The trackers 4 can self calibrate on where the viewer's eyes are located on the 3D TV screen or 3D display device 1 over a function of time (see FIG. 2B). Information about the user's interest can be determined based on where the user is looking on the screen and that information can be correlated to metadata about what is known about the location of objects on the screen for that frame. The metadata can be parsed out by the consumer electronics, communicated with the content, identified at a later point, or known to a server but not known on the consumer electronics device. Thus, this invention can generate gaze location information that can be correlated to what is on the screen at a location and a time. The gaze location information is collected unobtrusively and data is correlated with what objects the viewer is looking at.

The biometric data from the trackers 4 is used to determine the best content to be suggested to the user. This can be done in almost real-time such as during a commercial break when the next content is determined and thereafter the next content is provided to the user's display device.

The trackers 4 can be used to sense the location on the display at which the user's eyes are focused, and this focus position is thus known at the server or consumer electronic device. If a product is located at that location on the display, then the product that the user is interested in is known. This can be used to select commercials that are directed to the user's interest.

The glasses 5 can be personalized for each user knowing the user's identity and profile. When the user picks up his/her glasses 5, based on the user's identity and profile, the user's interest will be known. In addition, based on information from the consumer electronic device and/or server, the user's preferred TV settings will also be known so that content and commercials can be sent to the user based on the user's interest.

The television settings of the consumer electronic devices 2 and display device 1 can be controlled by the server 6 via the internet when the user's preferred setting are determined via the biometric data. Alternatively, the user's television settings can be overridden by the server 6 via the internet.

Figure 2A:
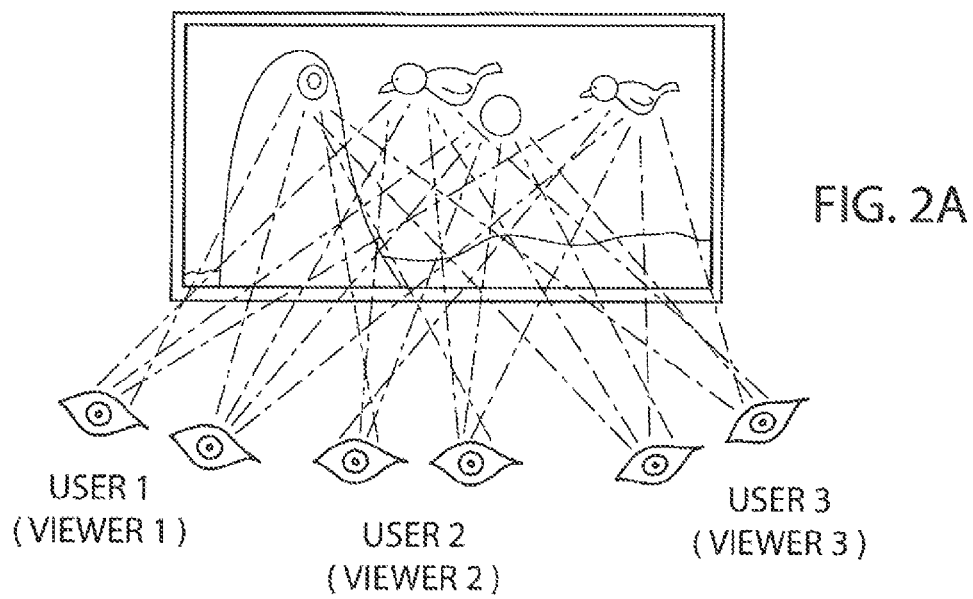
FIG. 2A shows locations of viewer's eyes on a display device and FIG. 2B shows a chart of self calibration based on FIG. 2A.
Figure 2B:
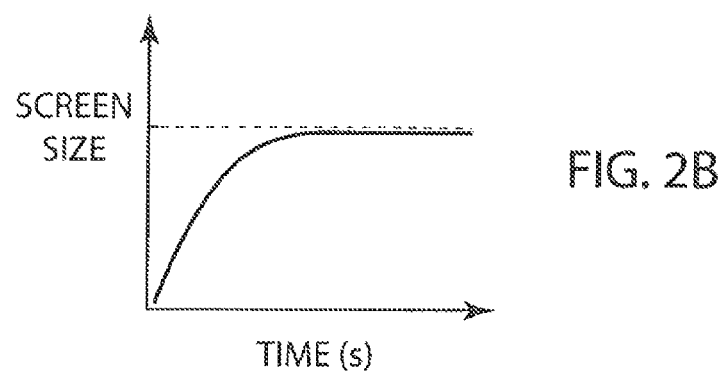

In order to obtain the baseline biometric data from the trackers 4 for a user, the biometric data obtained for a plurality of users is compared in order to interpret each user's data. The baseline data is accumulated from the several viewers watching the same content at the same time such as shown in FIG. 2A.

In the preferred embodiment, 3D glasses 5 are preferred to track eye movement since the distance between the user's eyes and the trackers 4 are close to the eyes resulting in accurate data. The trackers 4 are provided on the 3D glasses 5, which the user should use in order to watch 3D content. An important feature of the invention is that the glasses 5 containing the sensors 4 unobtrusively obtain the biometric data.

In order to obtain the biometric information, as shown in FIG. 3, the following occurs: (1) the viewer puts on the 3D glasses equipped with the eye movement trackers, (2) the viewer registers his/her eyes with the system/server either by supplying the user ID or by the user's glasses ID; alternatively visual patterns in the pupils of the user's eyes allow unobtrusive recognition of the user; new users could have a new profile created, (3) the trackers start to calibrate the location of the viewer's eyes on the display screen; as the viewer's eyes move around the display screen 1 and other locations in the room where the display screen is located, overtime there will be a plurality of (virtual) eye dots over the display screen; to get the exact boundary of the display screen and location of the eyes, first order differentiation is applied to the eye dots over time; this is self-calibration (see FIG. 2B), alternatively for step 3, the user can go through an active calibration step when the user first puts on the glasses; this could be done though eye movements such as fixating on each corner of the screen a couple times; this could be an optional step that would speed up the time in which the glasses have good calibration, (4) during 3D content viewing, the tracker 4 will track and monitor the viewer's eye gaze (what locations), fixation (how long) movements (patterns/directions of eye movements), and pupil dilation (an indicator of stress); Note: if the glasses are optionally worn during 2D content viewing, the trackers can track and monitor user biometrics as well, even though the glasses for 2D content are not needed, (5) the biometric data points are input in real-time to a data processing unit (not shown) which may be built into the glasses, built into the consumer electronics device or sent to a server 6 to build up a profile of degree of interest, a biometric information consists of two components: (a) degree of interest: gaze, fixation, eye movement/paths and (b) satisfaction levels: gaze, fixation, eye movement/paths and pupil dilations, a biometric profile about a particular use can include such features as pupil visual patterns that could be used to passively recognize the same user, the biometric profile would also contain baseline information about a user, such as the user's typical resting heart rate or pupil dilation amount for various light levels, (6) if an unregistered new viewer joins the viewing, biometric data will be collected passively for this new viewer to create a new profile which the user can register, the user's profile is identified through passive biometric data, so registration is optional, however, registration would allow the user to limit their account to an account he/she could access directly so as to link the profile to other accounts or input interests directly, alternatively, if the new user does not want to register, a default biometric profile is initially used based on customers across all devices, within that person's locality, language, date/time, etc. which changes over time as the default profile is continuously recalculated across all customers, the general default profile can then be customized for the new user based on sensor data (i.e. biometric data) specific to the user as the new user continues to use the system, (7) the user profile is retrieved and updated, (8) overtime, an accurate and actual degree of interest and satisfaction about a piece of content can be determined for a particular user/viewer as well as determining which portion of a scene or type of objects are most interesting to the user so that content, interest and satisfaction can be determined.

In addition to the trackers 4, the 3D glasses 5 may also contain a plurality of other sensors all of which are generally labeled reference numeral 11 in FIG. 4, the placement of the sensors 11 being only for illustrative purposes and can be placed anywhere on the glasses 5. One such sensor 11 may be for detecting head movement and direction such as an accelerometer and/or a gyroscope. For example, based on the head movement sensors, the server 6 or consumer electronic device can determine that the user is watching the screen or looking elsewhere. Additionally, a sudden head movement when there is a sudden change in the content would indicate that the user is immersed in watching the content. The gyroscopes and or accelerometers would be part of a spatial orientation detector.

A camera in the glasses could also be used in addition to or instead of gyroscopes and accelerometers to visually sense the orientation to the screen, which could be problematic in a dark room during a dark scene. Alternative, the screen may emit signals for the glasses to detect so that there is always a consistent signal for the glasses to detect. These signals may be visible, such as an illuminated bezel, or in a frequency that is not detectable by humans. These signals may be generated by the screen itself, the bezel or other portions of the device around the screen, or by separate transmitters, which would be useful when adding sensing to an existing display without support for sensing.

For a system where the display is not stationary, such as a hand held tablet display as opposed to a living room TV, there would likely be a spatial orientation detector on the display as well as on the glasses. In this case, if the display emits a signal that is detected by the glasses, then the detection of that signal would be in relation to the display, while sensors such as gyroscopes would sense the orientation of the user in space and would need to be coordinated with the orientation of the display in space.

Furthermore, the 3D glasses 5 may contain sensor(s) 11 to sense a user's touch of the glasses. The sensor(s) will pick up galvanic activity such as perspiration. Alternatively, sensor(s) 11 can be provided in order to come in direct contact with the user's head to sense brain activity. Temperature sensor(s) 11 may be provided on the glasses 5 in order to sense body temperature and/or to sense ambient temperature of the room.

The detectors 11 could also detect the ambient light level. The ambient light level can be used to normalize the pupil dilation amount for the effects of the light level to detect when pupil dilation changes are a reaction to the content instead of lighting changes. Other things that the detectors 11 may sense included the user's heart rate and the user's berating. For example, a sudden gasp by the user when there is a sudden change in the content would indicate that the user is immersed in viewing the content.

The internet protocol consumer electronic device 2 can send settings, such as television settings, via the internet to the server 6. Also, the consumer electronic device can determine different content settings of the display 1 such as the picture brightness, darkness, as well as whether the displayed content is directed to sports, drama, etc. which can also be sent to the server 6 in order to build the user profile.

The 3D glasses 5 may include audio sensor(s) 11 to sense audio of at least the user. Although the consumer electronic device(s) will know the audio level being produced based on the content, the audio sensors could also be used for this purpose. Additionally sensors 11 that may be mounted on the 3D glasses 5 may include sensors for determining the background noise or any sound disturbances. The background noise level can be factored into the determination of the user's interest level of the content. Additionally, the 3D glasses 5 may have headphones 11 mounted thereon. The ambient sound from microphones can be used to subtract the ambient sound from the directional sound detected from the user, similar to how noise canceling headphones work, to get a cleaner stream of audio that is produced by the user. The server 6 or consumer electronic devices 2 can therefore control the audio level of those headphones to overcome audio distractions.

A directional microphone 11 may be mounted on the 3D glasses 5. The directional microphone 11 can pickup audio from the user in order to pick up the user's gasps, talking to the show, conversations with others, etc. Thus, the output from the directional microphone 11 can be used by the server 6 or consumer electronic devices 2 in order to determine the interest level of the user in the content.

Most importantly, the trackers 4 and sensors 11 mounted on the 3D glasses 5 are used to calibrate and set up the user's profile and they are unobtrusive such that monitoring of the biometric information is done passively. Furthermore, this invention can be used in combination with less unobtrusive sensing methods and devices.

By bundling sensors 11 and 4 into the 3D glasses, passive calibration can be obtained so that the user does not know that data is being gathered. Furthermore, since the 3D glasses 5 contain the sensors 11 and 4, the sensing is unobtrusive. The server's correlation of the biometric data obtained from the sensors/trackers and content obtained from the consumer electronic devices 2 can be determined for a user. The use of accelerometers and gyroscopes 11 to sense movement of the glasses 5 on the user's head can be used to correlate the information. The sensors used on the 3D glasses can be of the type used in cell phones. Skin sensors may be metal contact plates. Trackers/cameras are used to sense the eye focusing with head movement. The 3D glasses 5 can thus be personalized for each user profile. The use of environmental data can be used to block out background noise and environmental disturbances via headphones. It should be noted that placement of a plurality of sensors 11 in FIG. 4 is illustrative only and does not limit the type, number or placement thereof.

The invention allows for real-time monitoring of a viewer's eye gaze, fixation, movements and pupil dilations in order to acquire a viewer's enjoyment and interest when viewing 3D content on a consumer electronic device over IP. User interest, derived from the biometric data, can be used for delivery of highly accurate personalized viewing experience such as sending commands and content tailored to the user among other purposes.

It will be recognized by those skilled in the art, that various modifications, alternative constructions and equivalence may be used without departing from the spirit and scope of the invention. Accordingly, the above description should not be taken as limiting the scope of the invention.

What is claimed is:

1. Glasses used for viewing an image on an associated internet protocol (IP) display device and for communication over the internet with at least an external server, comprising:
   a frame; and
   sensors that collect biometric data of a user of the glasses; and
   a wireless transmitter that wirelessly transmits the biometric data to a consumer electronic device that controls the IP display device, wherein the consumer electronic device transmits the biometric data to the external server that connects with the consumer electronic device via the internet, the external server storing a user profile including biometric information of the user and being capable of overriding display settings of the IP display device via the internet,
   wherein the sensors detect the user's gaze location on an image displayed on a display screen of the IP display device and generate biometric data associated with the detected gaze location such that the user's interests in an object in the displayed image is determined by correlating the biometric data of the gaze location with metadata of the image, the metadata including information about locations of objects in the image,
   wherein personalized content, which is to be displayed to the user, is selected by the external server based on (a) the user profile stored on the external server, (b) identifying the user through eye recognition by communication with the external server, and (c) user preferences from the external server,
   wherein the glasses provide an entry point to the personalize content from the external server for each user of the glasses viewing the associated IP display device.

2. The glasses according to claim 1, wherein the sensors are embedded in the frame.

3. The glasses according to claim 1, wherein the sensors are pluggable into the frame.

4. The glasses according to claim 1, wherein the sensors monitor the eye gaze.

5. The glasses according to claim 1, wherein the sensors monitor eye fixation.

6. The glasses according to claim 1, wherein the sensors monitor eye movement.

7. The glasses according to claim 1, wherein the sensors detect pupil dilation.

8. The glasses according to claim 1, wherein the biometric data obtained is for enabling display of personalized content on the IP display device.

9. The glasses according to claim 1 further comprising a plurality of sensors for monitoring additional biometric information.

10. The glasses according to claim 9, wherein the sensors include at least one of an eye tracking sensor, a spatial orientation sensor, a temperature sensor, audio sensor, microphone sensor, cerebral wavelength sensor, ambient light sensor, ambient sound sensor, heart sensor and a galvanic sensor.

11. The glasses according to claim 10, where the spatial orientation sensor includes one of a gyroscope, an accelerometer and a camera to detect one of a (1) screen of the display device and (2) visible or invisible signals emitted for detection by the glasses.

12. The glasses according to claim 10, wherein the ambient light sensor is for normalizing pupil dilation levels.

13. The glasses according to claim 10, wherein the ambient sound sensor is for determining user reactions to environmental distractions.

14. The glasses according to claim 1, wherein the sensors self calibrate passively on where the user's eyes are focused on the IP display device over time to determine one of the user's reaction and interest level.

15. The glasses according to claim 1, wherein the biometric data is used to automatically determine the user's profile.

16. The glasses according to claim 1, wherein the biometric data is used to create a new user's profile.

17. A method of obtaining biometric data using glasses used for (a) viewing an image on an associated internet protocol (IP) display device and (b) communication with at least an external server comprising the steps of:
   providing the glasses with sensors; and
   unobtrusively collecting biometric data of a user of the glasses; and
   wirelessly transmits the biometric data to a consumer electronic device that controls the IP display device, wherein the consumer electronic device transmits the biometric data to the external server that connects with the consumer electronic device via the internet, the external server storing a user profile including biometric information of the user and being capable of overriding display settings of the IP display device via the internet,
   wherein the collecting step detects the user's gaze location on a frame of an image displayed on a display screen of the IP display device and generates biometric data associated with the detected gaze location such that the user's interests in an object in the frame of the displayed image is determined by correlating the biometric data of the gaze location with metadata of the frame of the image, the metadata including information about locations of objects in the image,
   wherein personalized content, which is to be displayed to the user, is selected by the external server based on (a) the user profile stored on the external server, (b) identifying user through eye recognition by communication with the external server, and (c) user preferences from the external server,
   wherein the glasses provide an entry point to the personalize content from the external server for each user of the glasses viewing the associated display device.

18. The glasses according to claim 1 wherein eye recognition of the user is based on visual patterns in the pupils of the user.

19. The method according to claim 17 further comprising the step of monitoring eye gaze.

20. The method according to claim 17 further comprising the step of monitoring eye fixation.

21. The method according to claim 17 further comprising the step of monitoring eye movement.

22. The method according to claim 17 further comprising the step of monitoring pupil dilation.

23. The method according to claim 17 further comprising the step of enabling display of personalized content on the IP display device for the user based on the biometric data.

24. The method according to claim 17 further comprising the step of monitoring additional biometric information via a plurality of sensors.

25. The method according to claim 24 further comprising the step of monitoring at least a user's eye biometrics, spatial orientation, temperature, audio, cerebral wavelength, ambient light, ambient sound, heartbeat and galvanic activity.

26. The method according to claim 25, wherein monitoring spatial orientation includes detecting a screen of the display device and detecting visible or invisible signals emitted for detection by the glasses.

27. The method according to claim 25, wherein monitoring ambient light is for normalizing pupil dilation levels.

28. The method according to claim 25, wherein monitoring ambient sound is for determining user reactions to environmental distractions.

29. The method according to claim 17, wherein the biometric data is obtained by passive self calibration on where the user's eyes are focused on the IP display device over time to determine one of the user's reaction and internet level.

30. The method according to claim 17 further comprising the step of automatically determining a user's profile based on the biometric data.

31. The method according to claim 17 further comprising the step of using the biometric data to create a new user's profile.

32. A system for acquiring viewer interest when viewing content on an associated display device and for communication over the interne, with at least a server comprising:
   glasses containing sensors that collect biometric data of a user of the glasses;
   the display device displays to the user;
   a consumer electronic device that controls the display device; and
   the server that stores a user profile including biometric information of the user and is capable of overriding display settings of the IP display device via the Internet;
   wherein the glasses include a wireless transmitter that wirelessly transmits the biometric data to the consumer electronic device,
   wherein the sensors detect the user's gaze location on a frame of an image displayed on a display screen of the display device and generate biometric data associated with the detected gaze location such that the user's interests in an object in the frame of the displayed image is determined by correlating the biometric data of the gaze location with metadata of the frame of the image, the metadata including information that indicate locations of objects in the image,
   wherein the server determines, based on correlating the biometric data from the glasses to a particular time and location of an object displayed in an image on the display device, a user profile of the user's preferences and interests based on the biometric data received, wherein personalized content and commercials are selected by the server based on (a) the user profile stored on the server, (b) identifying the user through eye recognition by communication with the glasses and (c) user preferences from the server; and wherein the display device displays the personalized content and personalized commercials consistent with the user profile of the user's interests and preferences, wherein the glasses provide an entry point to the personalize content from the server for each user of the glasses viewing the associated display device.

33. The system as claimed in claim 32, wherein the server stores user preferences based on the biometric data, and controls the display device based thereon, wherein the user preferences determined from the received biometric data include (a) degree of interest based on gaze, fixation, and eye movements/paths and (b) satisfaction levels based on gaze, fixation, eye movement/paths and pupil dilations.

* * * * *